No. 869,335. PATENTED OCT. 29, 1907.
E. G. STAUDE.
MEASURING AND WEIGHING MACHINE.
APPLICATION FILED JULY 12, 1904.

9 SHEETS—SHEET 1.

WITNESSES
J. Jessen
M. Hagerty

INVENTOR.
EDWIN G. STAUDE
BY Paul & Paul
ATTORNEYS

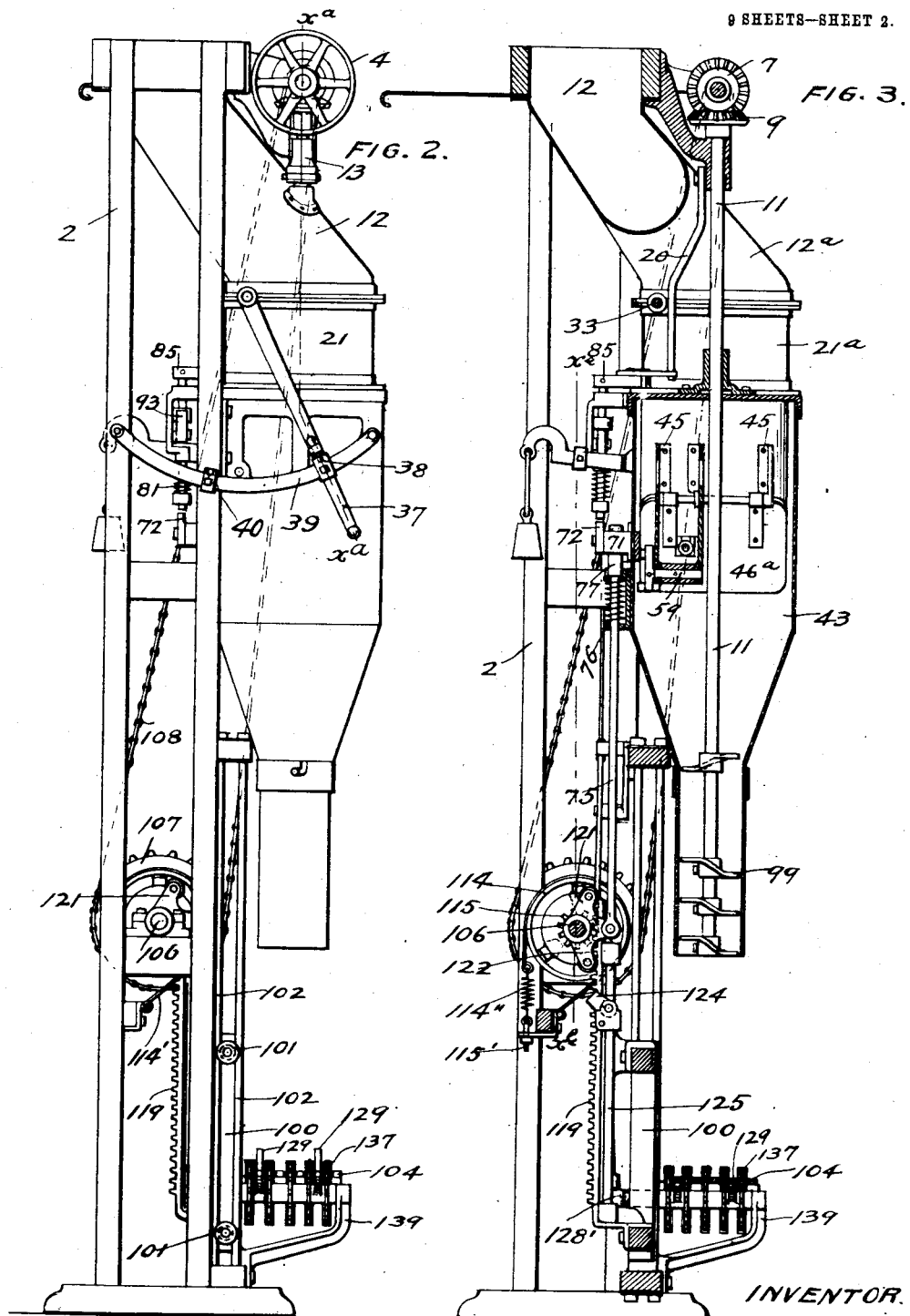

No. 869,335. PATENTED OCT. 29, 1907.
E. G. STAUDE.
MEASURING AND WEIGHING MACHINE.
APPLICATION FILED JULY 12, 1904.

9 SHEETS—SHEET 3.

WITNESSES

INVENTOR
EDWIN G. STAUDE.
BY Paul Paul
ATTORNEYS

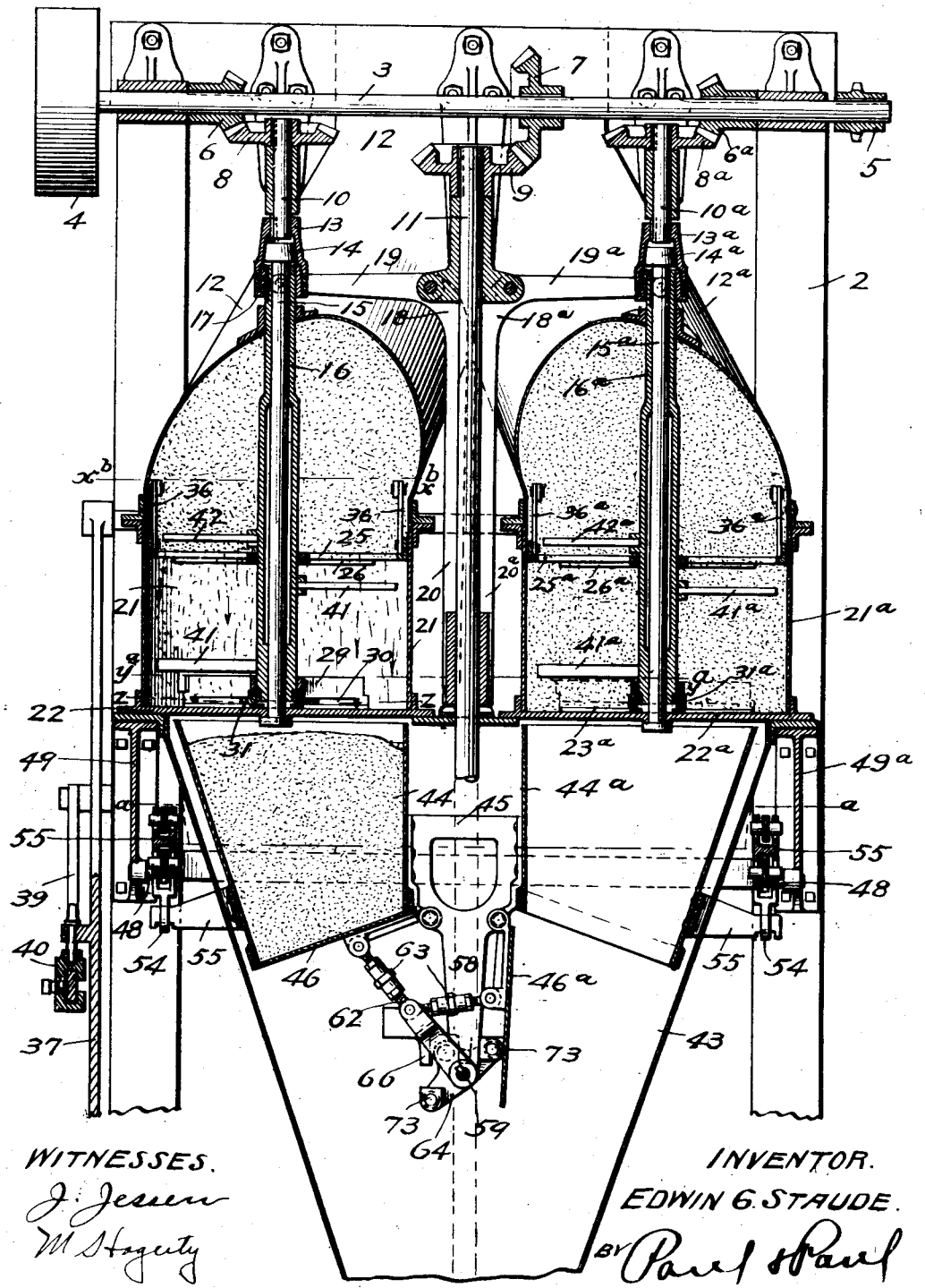

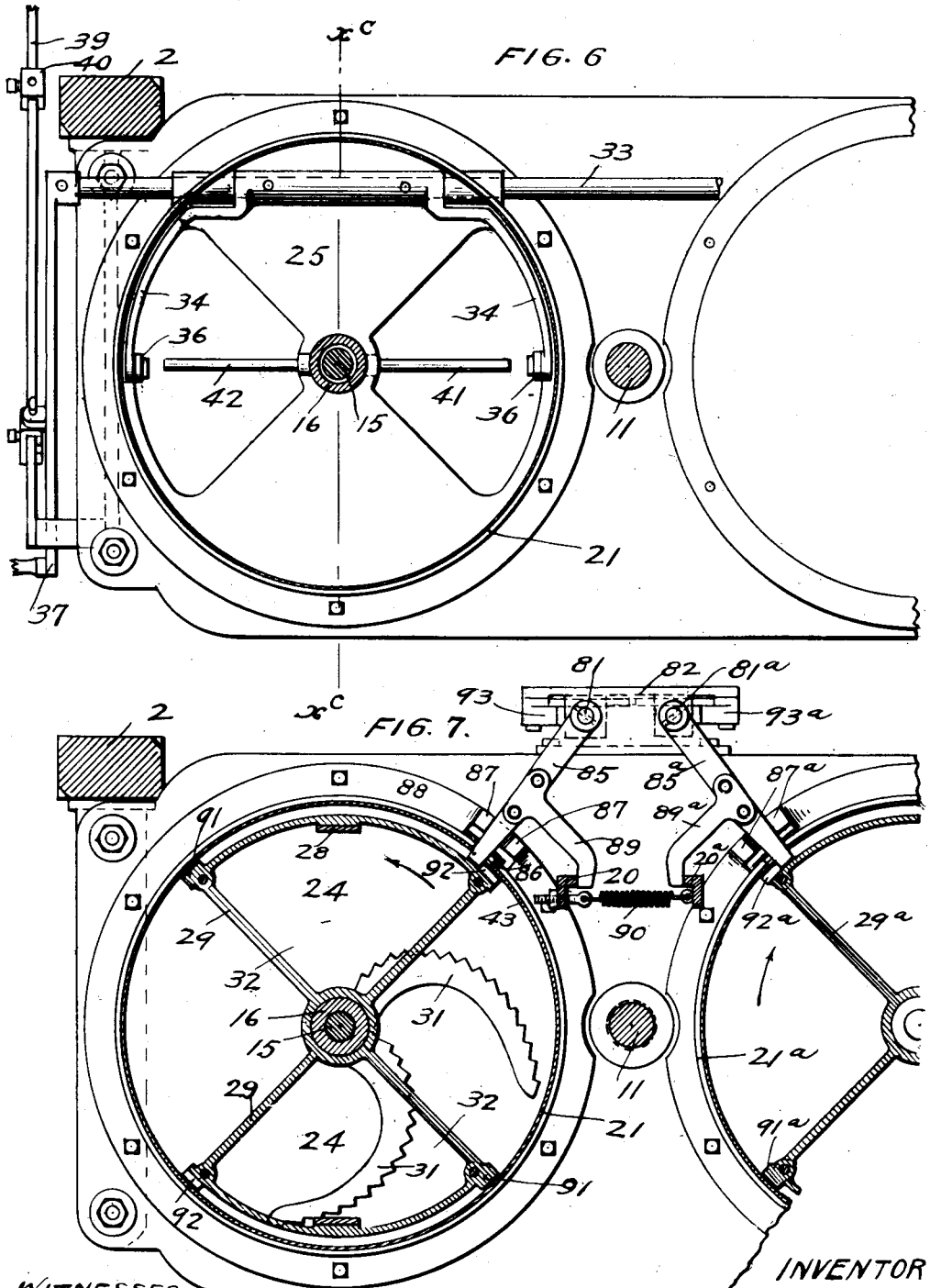

No. 869,335. PATENTED OCT. 29, 1907.
E. G. STAUDE.
MEASURING AND WEIGHING MACHINE.
APPLICATION FILED JULY 12, 1904.

9 SHEETS—SHEET 6.

WITNESSES
J. Jessen
M. Hegerty

INVENTOR
EDWIN G. STAUDE
BY Paul & Paul
ATTORNEYS

No. 869,335. PATENTED OCT. 29, 1907.
E. G. STAUDE.
MEASURING AND WEIGHING MACHINE.
APPLICATION FILED JULY 12, 1904.

9 SHEETS—SHEET 7.

WITNESSES
J. Jensen
M. Hagerty

INVENTOR
EDWIN G. STAUDE.
BY Paul & Paul
ATTORNEYS.

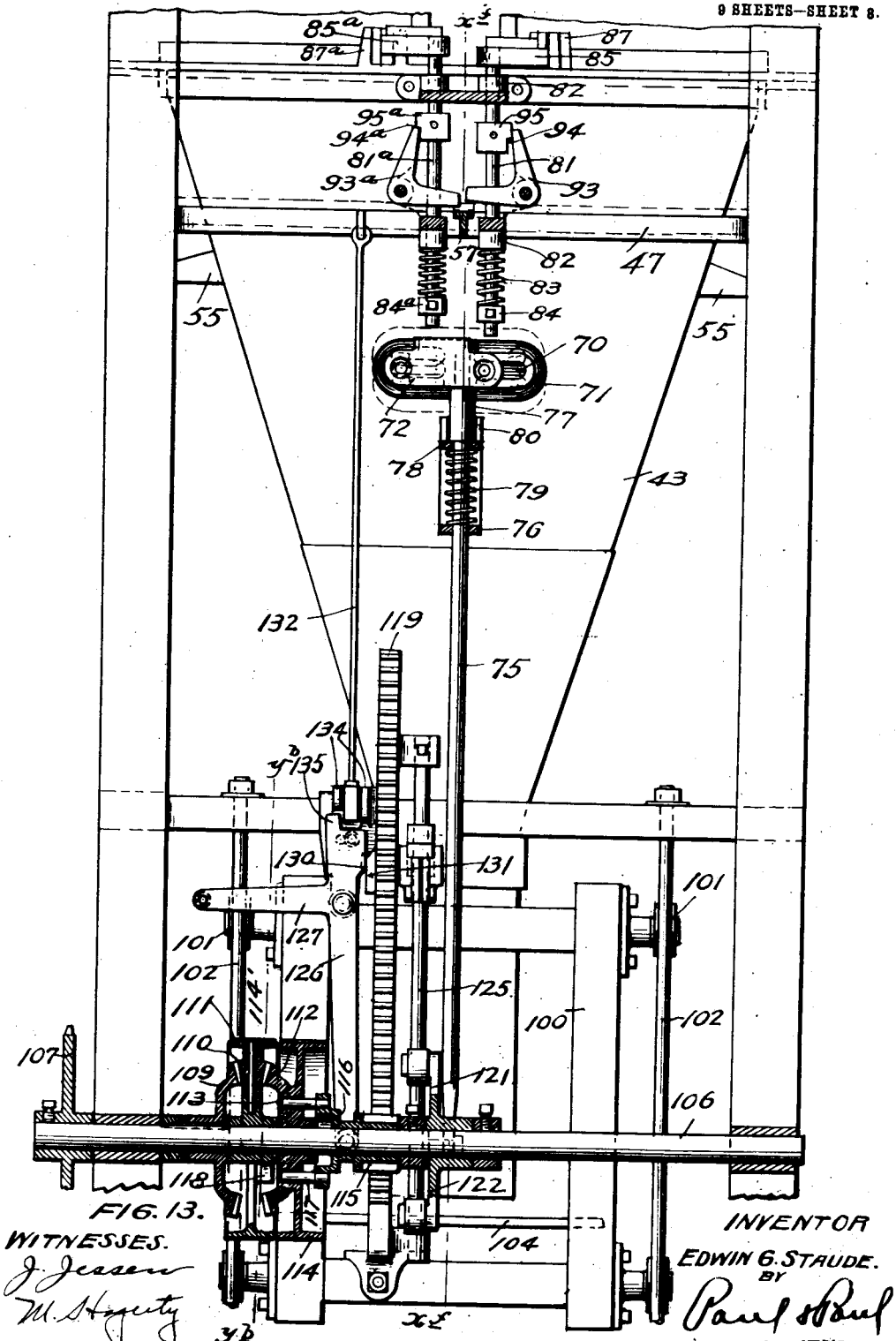

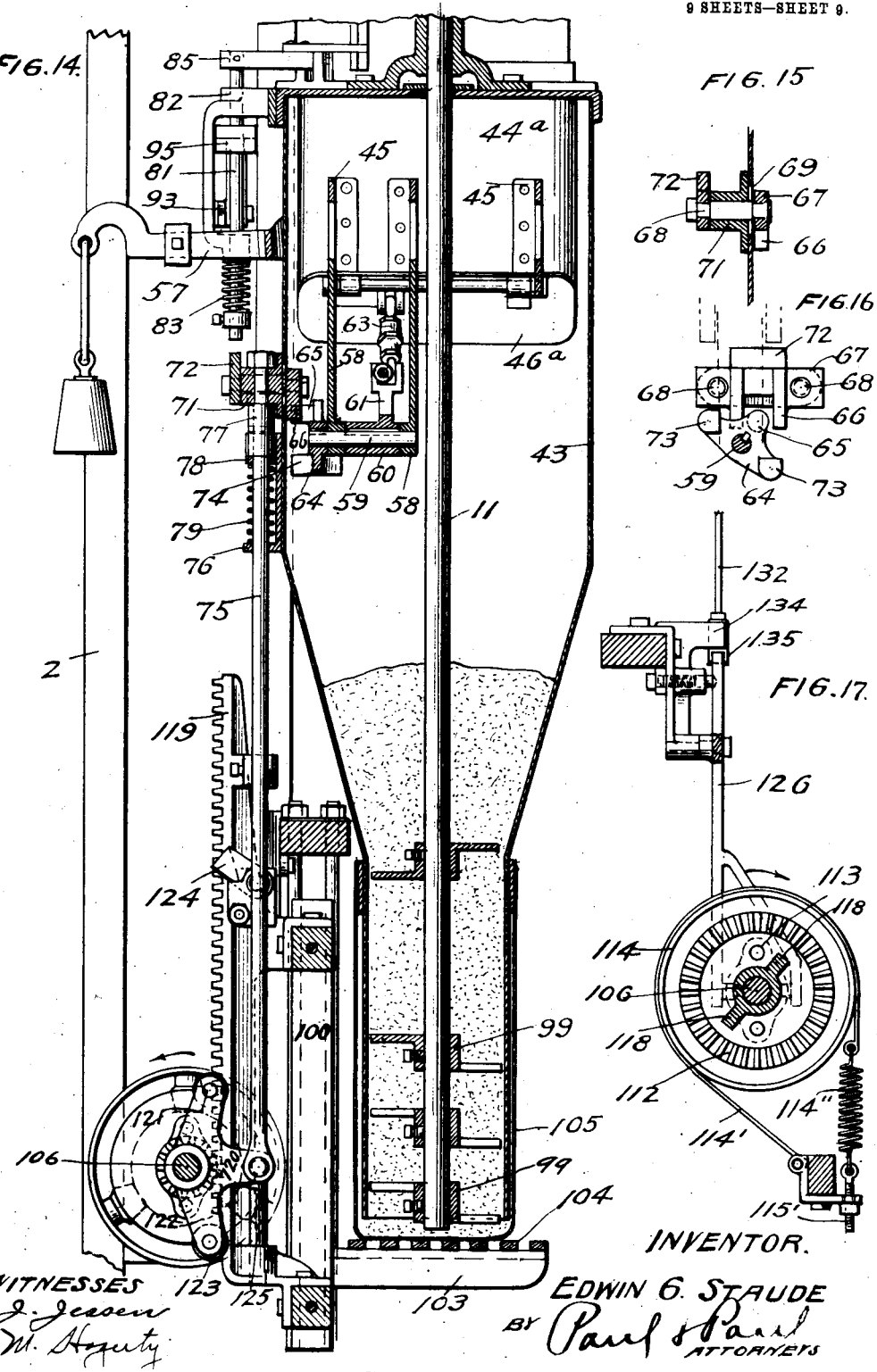

UNITED STATES PATENT OFFICE.

EDWIN GUSTAVE STAUDE, OF MINNEAPOLIS, MINNESOTA.

MEASURING AND WEIGHING MACHINE.

No. 869,335.　　　Specification of Letters Patent.　　　Patented Oct. 29, 1907.

Application filed July 12, 1904. Serial No. 216,235.

*To all whom it may concern:*

Be it known that I, EDWIN GUSTAVE STAUDE, of Minneapolis, Hennepin county, Minnesota, have invented certain new and useful Improvements in Measuring and Weighing Machines, of which the following is a specification.

My invention relates to machines for measuring and weighing cereals and their ground products, and is designed particularly for use in connection with a flour packer where it is desirable to deliver to the packing auger the desired amount to fill a sack marked for a certain weight.

The object of the invention is to provide a machine wherein the measuring and weighing operation is quickly and accurately performed, thereby insuring large capacity and great efficiency for the machine.

A further object is to provide a machine which can be easily and quickly adapted for filling sacks of different size.
Other objects of the invention will appear from the following detailed description.

The invention consists generally in mechanism for measuring the flour or other material preparatory to the packing operation.
Further the invention consists in providing a measuring device capable of expansion and contraction, according to the size of the sack to be filled.

Further the invention consists in providing a secondary feeding mechanism in connection with the measuring device.

Further the invention consists in an improved scale hopper and mechanism for discharging its contents.

Further the invention consists in various constructions and combination, all as hereinafter described and particularly pointed out in the claims.

Figure 1:
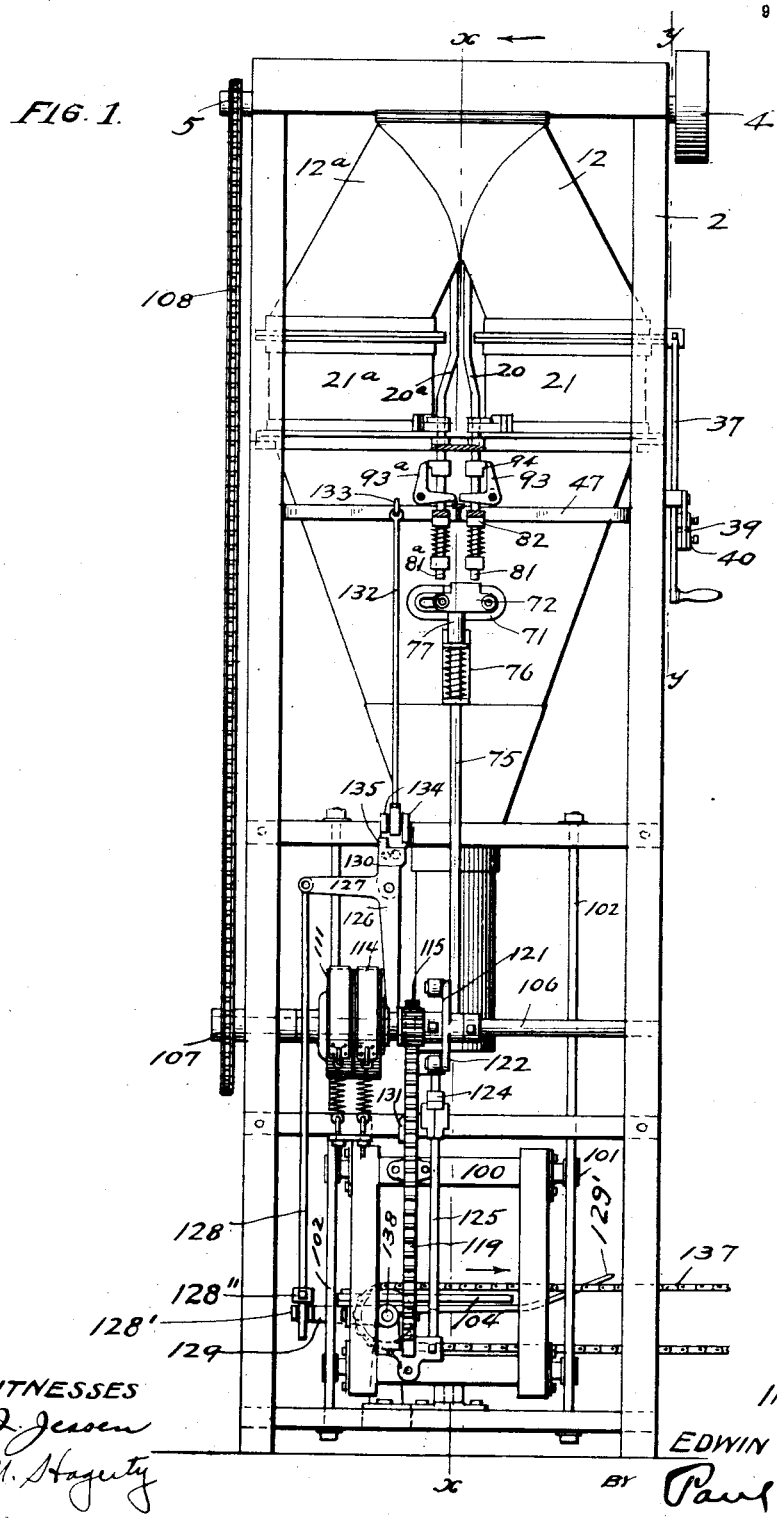
Figure 4:
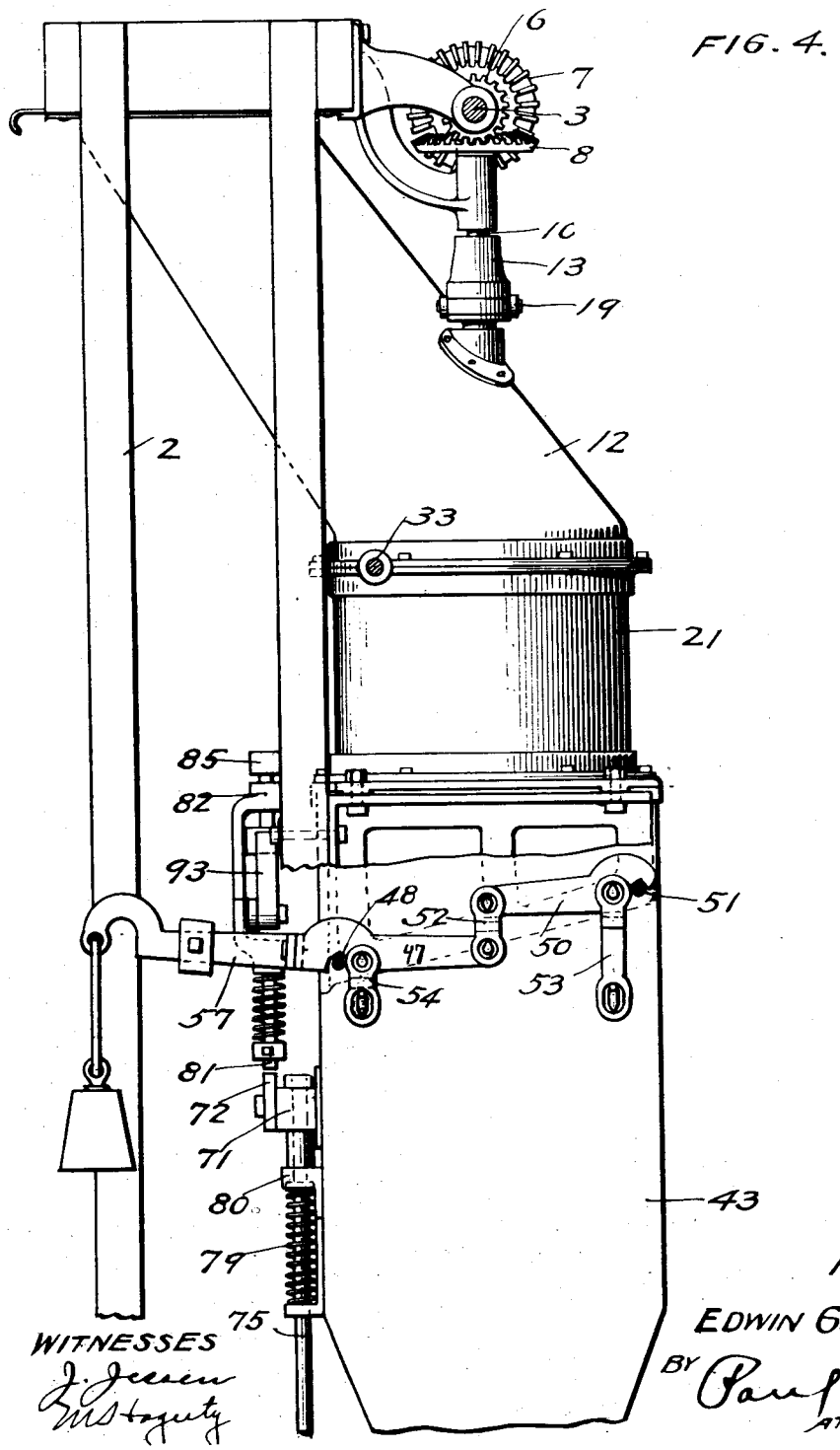
Figure 8:
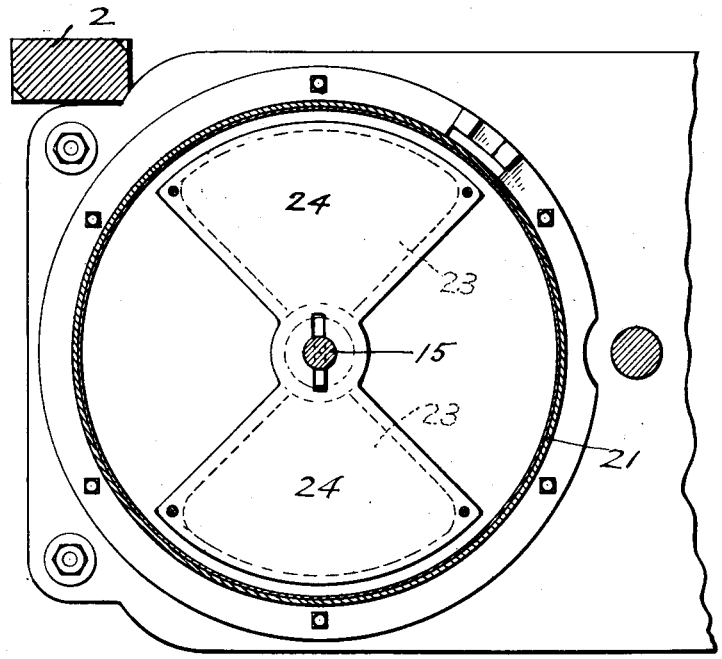
Figure 9:
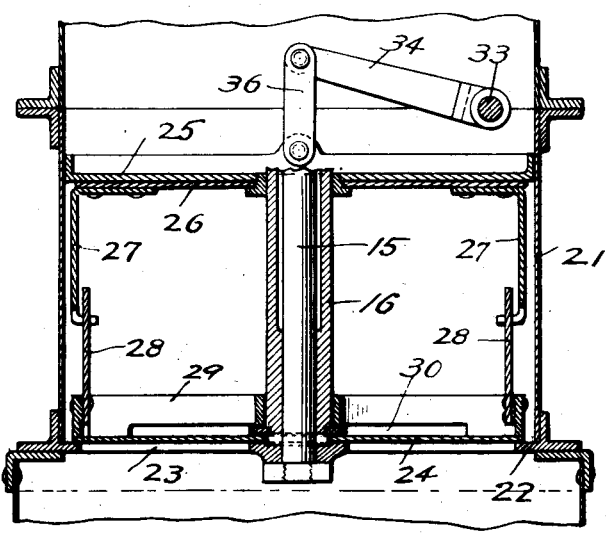
Figure 10:
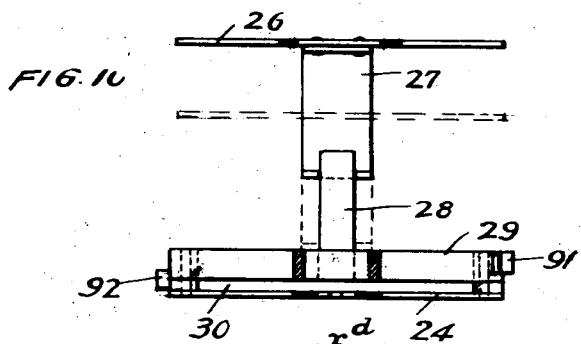
Figure 11:
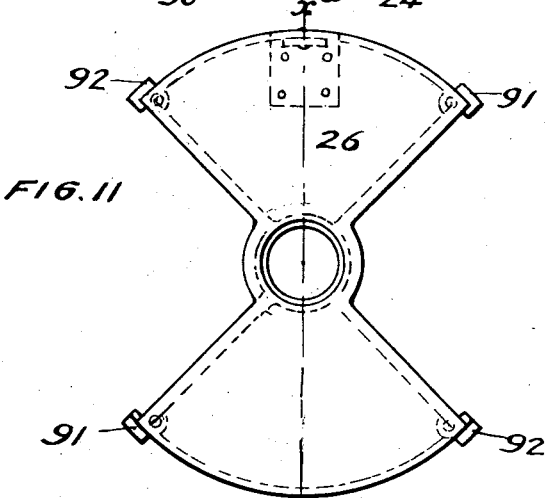
Figure 12:
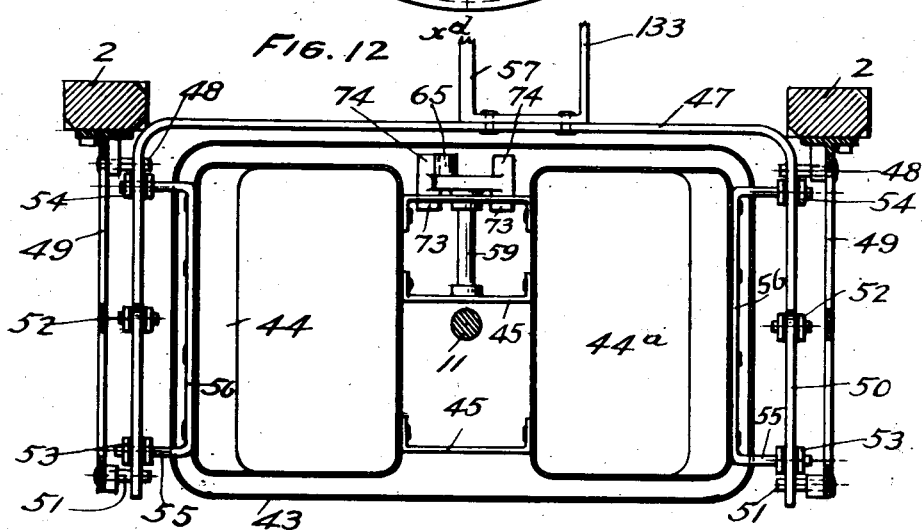

In the accompanying drawings, forming a part of this specification, Figure 1 is a rear elevation of a weighing and measuring machine embodying my invention. Fig. 2 is a side elevation of the same. Fig. 3 is a vertical section on the line $x$—$x$ of Fig. 1. Fig. 4 is a vertical section on the line $y$—$y$ of Fig. 1. Fig. 5 is a vertical sectional view on the line $x^a$—$x^a$ of Fig. 2. Fig. 6 is a horizontal sectional view on the line $x^b$—$x^b$ of Fig. 5. Fig. 7 is a similar view on the line $y^a$—$y^a$ of Fig. 5. Fig. 8 is a horizontal sectional view on the line $z$—$z$ of Fig. 5. Fig. 9 is a vertical sectional view in detail on the line $x^c$—$x^c$ of Fig. 6. Fig. 10 is a detail view in section on the line $x^d$—$x^d$ of Fig. 11. Fig. 11 is a plan view of the revolving cut-off device provided in the bottom of the hopper. Fig. 12 is a horizontal section on the line $a$—$a$ of Fig. 5. Fig. 13 is a vertical section on the line $x^e$—$x^e$ of Fig. 3, the carriage being shown in its raised position. Fig. 14 is a vertical section on the line $x^f$—$x^f$ of Fig. 13. Figs. 15 and 16 are details of a portion of the mechanism used for opening one hopper and closing the other. Fig. 17 is a detail sectional view on the line $y^b$—$y^b$ of Fig. 13.

In the drawing (see Fig. 5), 2 represents a suitable frame wherein the measuring and weighing mechanism is supported. 3 is a horizontal shaft mounted in bearings in said frame and having a driven pulley 4 at one end and a sprocket 5 at the other. Bevel pinions 6 and 6$^a$ and 7 are mounted on said shaft and adapted to engage bevel gears 8, 8$^a$ and 9 that are keyed on the shafts 10, 10$^a$ and 11. The shaft 3 is operated continuously from some suitable source of power. Near the shaft 3 is a flour spout 12 having branch spouts at its lower end. These branch spouts have similar functions and are each equipped with a measuring mechanism beneath which weighing hoppers are provided.

The measuring and weighing mechanism in one spout is practically a duplicate of the one in the other and I will, therefore, describe the construction and operation of one only, indicating the corresponding parts of the other by the same reference numerals with the addition of the exponent $a$. These measuring devices, while similar in construction and operation, are oppositely arranged, that is, one will be open to discharge its contents while the other is being filled, and a corresponding condition will exist between the scale hoppers beneath, being filled and emptied alternately. This arrangement allows the continuous operation of the machine and largely increases its capacity.

In the drawing I have designated one of the branch spouts by reference numeral 12 and the other by a similar reference numeral with the addition of the exponent $a$, as above stated.

A cup 13 is splined on the lower end of the shaft 10 and adapted to receive the tapered head 14 of a vertically arranged shaft 15. A sleeve 16 is loosely mounted on said shaft and a ring 17 is splined on the upper end of said sleeve and is threaded to receive the lower end of the cup 13. Movement of the ring 17 up and down on its sleeve will raise the cup 13 away from the tapered head 14 or allow it to contact therewith. The sleeve 16 moves continuously through its connection with the shaft 3, while the shaft 15 has an intermittent movement, depending on the position of the clutch members 13 and 14.

A bell crank 18 is pivotally supported between the branch spouts and has a forked arm 19 pivotally connected with the ring 17, and a depending arm 20 through which the bell crank is rocked to throw the clutch mechanism into its operative or inoperative position. Below the branch spout 12 I provide a cylindrical receptacle 21 wherein the measuring operation is performed. The bottom of this receptacle rests upon a plate 22 having triangular discharge openings 23 through which the flour or other material that is being measured is delivered to the scale hopper beneath (see

Figs. 5 to 9). Above the plate 22 and secured on the lower end of the shaft 15 is a sector-shaped plate 24 adapted to coincide and close the openings 23 in the plate 22 beneath. A plate 25 is loosely mounted on the sleeve 16 and has openings, corresponding to those in the plate 22, and a stationary plate forming the top of the receptacle, while the plate 22 constitutes the bottom thereof. A plate 26, also sector-shaped, is loosely mounted below the plate 25 and adapted to close the openings therein and check the feed of material into the measuring receptacle. Straps 27 secured to the plate 26 have a sliding connection with arms 28 on the plate 24, said connection allowing the vertical adjustment of the plates 25 and 26, to vary the size of the measure and also serve to transmit the revolving movement of the plate 24 to the plate 26. As above stated, these plates are similar in form but are oppositely arranged, one closing the openings in its plate while the other uncovers corresponding openings in the other plate and it, therefore, happens that when the feed openings in the measure are uncovered, the discharge openings will be closed and vice versa.

The plate 24 is provided at its upper surface with radial ribs 29 having slots 30 (see Figs. 7 and 9) through which curved toothed arms 31 are arranged to operate. These arms are mounted on the lower end of the sleeve 16 and turn continuously therewith. Their function is to feed the flour or other material out of the little pockets 32 formed by the ribs 29 on the surface of the plate 24, into the discharge openings that lead to the scale hopper. A considerable quantity of flour is discharged at once from the measure into the hopper and the operation of the arms 31 serves to continue the feed in small quantities until the scale balances when the hopper will be dumped and the bottom of the measure closed simultaneously.

If all flour of the same bulk had the same weight it would not be necessary to provide any weighing apparatus in connection with a packer, as a measure could be easily constructed that would hold the proper amount of flour for the sacks of different size. It has been found, however, that flour, as well as other cereal products, varies considerably in weight though the bulk may be the same and it is, therefore, necessary to weigh the flour either before or after its delivery to the sack.

I have found that by employing the measuring device in connection with the scale that all the flour necessary to fill a sack, except a little to balance the scale, can be dumped into the scale hopper at one operation instead of being slowly fed thereto, and the capacity of the machine is thereby greatly increased.

To adjust the upper plate or top of the measure in different positions, according to the size of the sack to be filled, I provide a shaft 33 (see Fig. 6) having arms 34 secured thereon that are pivotally connected by links 36 (see Fig. 9) with the plate 25.

A crank 37 (see Figs. 1, 2 and 6) is secured on the shaft 33 and is provided with a pin 37' adapted to fit holes in blocks 38 adjustably mounted on a curved bar 39 having marks (not shown) to indicate the proper position of the crank for sacks of different size. An adjustable stop 40 is arranged on the bar 39 by means of which movement of the crank may be limited.

Suitable stirring arms 41 are mounted on the sleeve 16 within the measuring receptacle, and a third arm 42 for a similar purpose is provided on the top of the measure and serves to prevent flour or other material from clogging in the opening leading thereto.

Below the spouts 12 and 12$^a$ is a cone shaped casing 43 within which the scale hoppers are arranged. These hoppers comprise open topped receptacles 44 and 44$^a$ secured together by brackets 45 and provided with pivoted doors 46 and 46$^a$ arranged to close the bottoms of the hoppers. A yoke 47 has knife edge bearings 48 in brackets 49, on each side of the machine at the rear, and scale levers 50 have bearings 51 on said brackets at one end and links 52 connecting their other ends with the yokes 47 (see Figs. 4, 5 and 12). Links 53 and 54 connect the scale lever 50 and the yoke 47 with arms 55 provided on brackets 56 secured to the sides of the scale hoppers and projecting through the walls of the cone shaped casing 43.

A scale beam 57 is secured to the yoke 47 (see Figs. 3, 4, 12 and 14) and is provided with the usual balance weights, one of which is adjustable on the beam to allow the scale hoppers to be brought to a balance. The scale hoppers are arranged so that when one is being opened to discharge its contents, the other will be closed and in process of being filled, and when the load is wholly discharged from one and it is ready to be filled again, the other will be filled and ready to dump.

I will now proceed to describe the mechanism for closing and opening the scale hoppers and for regulating the discharge of flour from the measuring receptacles. Between the scale hoppers I provide hangers 58 wherein a short shaft 59 is journaled. A sleeve 60 is keyed on this shaft and provided with an arm 61 having a forked outer end having pivotal connections 62 with the hinge bottoms 46 and 46$^a$ of the scale hoppers. Turn-buckles 63 are provided in said pivotal connections to allow the proper adjustment of the hinged bottoms (see Figs. 5 and 14).

A block 64 is mounted on the forward end of the shaft 59 (see Figs. 14, 15 and 16) and provided with a centrally arranged lug 65 on its outer face that extends between lugs 66 on a plate 67. This plate is arranged on the wall of the cone shaped casing 43 and is held in place by pins 68 that pass through said plate and through a slot 69 in said wall, and also through slots 70 in a block 71 on the outer surface of said wall and finally are secured in a plate 72 that is arranged to slide horizontally on said block 71. The slot 69 allows the vertical movement of the block 71 while the plates 67 and 72 move vertically with said block and have in addition a horizontal movement in the slots 70 independently of said block. The block 64 is provided on each side, at both ends, with lugs 73 and 74; the former are on the inner side and engage the hangers 58 to limit the movement of the block, while the lugs 74 are in the path of the plate 67 to cause the oscillation of the block 64 and its shaft when the plate is depressed.

A rod 75 vertically movable in bearings in a bracket 76 is secured at its upper end to the block 71 between the slots therein. A sleeve 77 is secured on said rod and below said sleeve is a loose washer 78. A spring 79 is coiled about said rod between the brackets 76 and said washer, and lugs 80 provided on said bracket in the path of the washer prevent the spring from exerting its power on the rod beyond a certain point, but allow the rod to be moved vertically when desired.

The principal function of the spring 79 is to return the rod to its normal position after each operation of the machine (see Figs. 13 and 14). Above the plate 72 (see Figs. 13 and 14) are two vertically movable shafts 81 and 81ª slidable in guides 82 on the machine casing and normally held in a depressed position by springs 83 arranged between the guides 82 and blocks 84 adjustable on said shafts. The upper ends of these shafts are provided with levers 85 and 85ª (see Figs. 7, 13 and 14). These levers are identical in construction and operation and a description of one will suffice, it being understood that the other is similarly arranged and operates in substantially the same manner. The end of the lever 85 projects through a slot 86 in the casing 43 between stops 87 on a ring 88 arranged at the top of the conical casing (see Figs. 7 and 13). Sufficient space is provided between the stops 87 to allow horizontal movement of the lever, and the slot 86 is of sufficient size to permit such movement and also a vertical movement. An arm 89 is secured on said lever and arranged to engage the arm 20 of the contiguous bell crank, said arm being normally drawn toward the corresponding arm of the other bell crank by a spring 90, the effect of such drawing movement being to set the clutch mechanism, and start the shafts 15 which control the feed and cut-off devices of the measuring receptacles. The plate 24, which I prefer to designate as the cut-off plate, is provided with four stops 91 and 92 oppositely arranged and in different horizontal planes, the stops 91 being above the level of the other two. The end of the lever 85 projects in the path of these stops and in its depressed position engages one of the stops 92 and arrests movement of the cut-off, and in its elevated position engages one of the other stops 91, for a similar purpose. There being four of these stops, two upon each side of the cut-off, it follows that the revolving plate or cut-off device will have an intermittent movement, making four stops with each revolution, each movement being equal to a quarter turn, and the discharge and openings in the bottom of the machine will in consequence be alternately exposed and covered by the movement of the cut-off plate.

As soon as the lever 85 has been moved to clear the stop with which it is in contact, the tension of the spring 90 will swing the lever 85 to one side of the slot 86 and oscillate the bell crank to set the clutch and start the shaft on that side of the machine. The cut-off will make a quarter turn, when one of the other stops will engage the lever 85, return it to the other side of the slot 86, separate the bell cranks and release the clutch to stop the shaft and cut-off.

The scale beam 57 extends between the shafts 81 and 81ª (see Figs. 1 and 13) and is adapted to trip the bell cranks 93 which have one arm extending over the scale beam and the other arm arranged to enter a notch 94 in blocks 95 secured on the shafts 81 and 81ª. When one of the shafts is raised the bell crank will drop by gravity into the notch in the block and prevent downward movement of the shaft until the bell crank is tripped by the tilting of the scale bottom when the hopper is filled.

The shaft 11 is continuously driven from the shaft 3 through the gears 7 and 9 and the lower end of said shaft 11 is concentric with the cylindrical lower end of the casing 43 and provided with augers 99 (see Fig. 14). A frame 100 is provided on each side with anti-friction rollers 101 adapted to travel between rods 102 vertically arranged in the machine frame. A bracket 103 is provided on the frame 100, having a slotted floor 104 whereon the sack 105 rests while being filled. The sack will telescope with the lower end of the packing cylinder, as shown in Fig. 14, and will gradually be depressed as it is filled.

I will now describe the mechanism for raising the sack platform and simultaneously starting the measuring and weighing mechanism to supply a quantity of flour, or other material, to the packing auger. 106 is a continuously driven shaft mounted in the lower portion of the machine frame and provided with a sprocket wheel 107 driven by a chain 108 from the sprocket 5 on the shaft 3 (see Figs. 1, 5 and 13). A compensating gear is mounted on the shaft 106 and comprises a member 109 splined on the shaft and having teeth to engage the pinions 110 on the loosely mounted middle member or ring 111. The other member 112 of the gear engages the pinions 110 on the other side and is provided with holes 113 arranged to register with similar holes in a brake wheel 114 integral with the gear 112. A pinion 115 is loosely mounted on the shaft 106 and is provided with a flange 116 carrying pins 117 that are slidable in the holes 113 and are adapted to engage lugs 118 on the wheel or ring 111. When, therefore, these pins are moved into the path of the lugs 118 the pinion, the wheels and the compensating gear will all be temporarily locked on the shaft through their connection with the splined gear member 109.

A rack bar 119 is mounted on the frame 100 with its teeth in engagement with the pinion 115 and the revolution of the pinions will cause a vertical movement of the rack bar and the frame 100 (see Fig. 13).

The wheels 111 and 114 are provided with brake straps 114' that are pivoted at one end and provided at their other ends with coil springs 114'' connected to adjusting threaded pins 115'. By means of these pins the relative frictional contact of the straps with the rims of the wheels can be adjusted to regulate the speed of descent of the frame or carriage 100 and thereby regulate the packing of the flour. If the carriage descends slowly the flour will be packed harder than if the carriage descends rapidly.

The lower end of the rod 75 (see Fig. 14) is pivotally connected to the bell crank 120 having arms 121 and 122 provided with anti-friction rollers 123, said bell cranks being loosely mounted on the shaft 106 in the path of a dog 124 adjustably secured on a vertical rod 125. A pivoted lever 126 has a forked end pivotally connected with the pinion 115 and an arm 127 connected by a rod 128 with a lever 129 (see Figs. 1 and 13). This lever is loosely mounted on the shaft 138 and provided with a forked arm 128' arranged to engage a collar 128'' adjustably secured on the rod 128. The lever 129 has upwardly-turned ends 129' that extend above the level and between the bars 104 and conveyer chains 137 that pass around sprockets 137' secured on the shaft 138. When the carriage 100 descends the bars 104 will pass down between the conveyer chains which engage the bottom of the sack and remove it from the platform without any attention on the part of the operator. If desired the collar 128'' can be moved out of the path of the forked arm 128' and the operator can oscillate the lever 126 by the manipulation of the rod 128.

The lever 126 is provided on one side with a cam surface 130 in the path of a lug 131 on the rack bar 119. When this rack has reached a certain point in the ascent of the carriage, the lug 131 will engage the surface 130, oscillate the lever 126 and disengage the pins 117 from the lugs 118 and stop further upward movement of the carriage, (see Fig. 13). A rod 132 is pivotally connected at its upper end to an arm 133 on the yoke 47 and the lower end of said rod depends between stops 134 in the path of a lug 135 on the lever 126 and acts as a stop to prevent the oscillation of the lever and the ascent of the carriage until the yoke 47 has been tilted by the balancing of the scale hopper.

The following is a brief description of the operation of the machine: Assuming that one of the scale hoppers is filled with flour and the other empty, the attendant will place a sack on the cylindrical lower end of the spout inclosing the packing auger and oscillate the lever 126 to start the carriage. When the dog 124 engages the arm 122 the rod 75 will be drawn downward, the filled hopper will be opened and its contents delivered to the packing auger beneath. The bottom of the other scale hopper will be simultaneously closed. This operation takes place after the dog 124 actuates the arm 122 and before it engages the arm 121. When the dog 124 engages the arm 121 the rod 75, having previously been returned to its normal position by the spring 79, will be raised and the plate 72 engaging the vertically movable shaft above it, that is in its depressed position, will raise the said shaft and the lever carried thereby, releasing the cut-off mechanism and opening the bottom of the measure to allow its contents to be discharged into the scale hopper beneath. The capacity of the measure will be regulated according to the size of the sack to be filled and nearly enough flour or other material to balance the scale will be discharged into the hopper immediately upon opening the bottom of the measure. An additional quantity will be delivered to the scale hopper through the operation of the drip feed device. The cut-off device will make a quarter-turn and engaging the stop lever in its raised position will be held against further movement until the lever and its shaft are depressed. As soon as the scale balances the beam 57 will be tilted and engaging the pawl or bell-crank that holds the shaft in its raised position will trip the same and allow the shaft to return to its normal position. The cut-off will again be released to make another quarter-turn to the starting point and close the discharge opening in the bottom of the measure. By this time the sack carriage will have been depressed to its lowest position, the filled sack automatically removed and during such removal the lever 129 will be operated to again set the carriage in motion and repeat the operation.

I claim as my invention:

1. The combination, of a sack packing device with a sack platform, mechanism controlled by the movement of said platform for automatically measuring the material, and a weigher arranged to receive a predetermined load from said measuring mechanism and deliver it to said packing device.

2. The combination of a sack packing device with a vertically movable sack platform, a feed spout, a measuring device, mechanism controlled by the movement of said platform for regulating the feed into said measuring device and the discharge therefrom, and a weigher arranged to receive a given load from said measuring device and deliver it to said packing device.

3. The combination, of a packing device with a platform, a feed spout, a measuring device located therein, mechanism controlled by the movement of said platform for regulating the feed of material into said measuring device and its discharge therefrom, a drip discharge device provided in connection with said measuring device and a weigher arranged to receive a given load from said measuring device and discharge it into said packing device.

4. The combination, of a sack packing device with a sack platform, a feed spout, a measure therein, cut off devices for regulating the feed into said measure and the discharge therefrom, mechanism arranged to be operated by the movement of the sack platform for actuating said cut off devices, a revolving drip discharge device provided in said measure and a weigher arranged to receive a load of given weight from said measure and discharge it into said packing device.

5. In a measuring and packing machine, the combination, of a feed spout with an expansible measuring device provided in said spout and having feeding and discharge openings and cut off plates arranged to alternately open and close said openings, and a weigher arranged to receive a predetermined load from said measuring device.

6. The combination, with a packer, of a feed spout, a measuring device having feed and discharge openings, a cut off mechanism, means arranged to discharge a small quantity of material from said measuring device after the main portion has been discharged by the opening of said cut off, and a weigher arranged to receive a predetermined load from said measuring device and discharge it into said packer.

7. In a measuring and packing machine, the combination with a feed spout, of a receptacle having feed and discharge openings and cut-off plates therefor, mechanism for operating said plates, and a weigher arranged to receive a predetermined load from said receptacle, substantially as described.

8. The combination, of a feed spout, with a measuring device located therein and having feed and discharge openings, the top of said measure being movable toward and from the bottom thereof, a shaft having arms pivotally connected with said top, a crank mounted on said shaft, and a rack bar past which said crank is movable, for the purpose specified.

9. The combination, of a feed spout, with a measuring device located therein and having top and bottom plates provided respectively with feed and discharge openings, cut-off plates arranged to alternately open and close said feed and discharge openings, mechanism for intermittently operating said cut-off plates, and revolving arms arranged to discharge a small quantity of material from said measuring device after the main portion has been discharged by the opening of said cut-off device.

10. The combination, of a feed spout, with a measuring device provided therein and having feed and discharge openings in its top and bottom respectively, revolving cut-off plates having a step by step movement arranged to alternately open and close said openings, mechanism for operating said plates intermittently, the lower plate being provided with pockets having slotted walls, and revolving arms operating through said slots and pockets, for the purpose specified.

11. The combination, with a packer, of a series of feed spouts, measuring receptacles provided in said spouts and having feed and discharge openings and cut-off devices therefor, and mechanism for alternately operating said cut-off devices.

12. The combination, of a packing auger and a vertically movable scale platform, with feed spouts upon each side of said auger, measuring devices provided in said spouts and having feed and discharge openings, and mechanism controlled by the movement of said platform for regulating alternately the feed of material into said measuring devices and its discharge therefrom, substantially as described.

13. The combination, of a sack packing auger, with a sack platform, and mechanism controlled by the movement of said platform for automatically measuring and weighing the material prior to its delivery to said auger.

14. The combination, of a packing auger, with a vertically movable sack platform, feed spouts, measuring devices provided therein, mechanism controlled by the movement of said platform for regulating the feed of flour or other material into said measuring device and its discharge therefrom, alternately operating scale hoppers provided beneath said measuring devices, and mechanism also controlled by the movement of said sack platform for regulating the discharge of material from said hoppers.

15. The combination, of a packing auger, with a vertically movable sack platform, two scale hoppers having pivoted bottom plates, a weighing mechanism in connection with said hoppers, and mechanism arranged to be actuated by the movement of said platform for opening and closing said bottom plates, substantially as described.

16. The combination, of a packing auger, with a feed spout, a scale hopper having a pivoted bottom within said spout, a scale mechanism in connection with said hopper, a shaft beneath said hopper, a block mounted thereon, a crank carried by said shaft and pivotally connected with said hopper bottom, a vertically movable sack platform, and mechanism actuated by the movement of said platform for oscillating said block and opening and closing said hopper bottom, substantially as described.

17. The combination, of a feed spout, with scale hoppers having pivoted bottom plates therein, a scale mechanism in connection with said hoppers, a rock shaft having an arm pivotally connected with said hopper bottoms, a block secured on said rock shaft, a packing auger, a vertically movable sack platform, a reciprocating rod having a plate arranged to engage and oscillate said block and shaft, and mechanism actuated by the movement of said platform for reciprocating said rod, substantially as described.

18. The combination, of a feed hopper, with a yoke supported in knife-edge bearings therein, a scale mechanism provided in connection with said yoke, scale hoppers having pivoted bottom plates rigidly supported in said yoke, a packing auger, a sack platform, and mechanism controlled by the movement of said platform for operating said bottom plates to open and close said hoppers.

19. The combination, of a feed spout and a packing auger therein, with a vertically movable carriage, a shaft, a bell crank thereon having oppositely extending arms, a reciprocating rod pivotally connected with said bell crank intermediate to said arms, a measuring and weighing mechanism arranged to be operated by the movement of said rod, and a tripping dog carried by said carriage and arranged to engage said bell crank arms, substantially as described.

20. The combination, of a feed spout, with the measuring devices therein, revolving cut-offs provided with suitable stops upon different levels, levers arranged in the path of said stops, vertically movable shafts whereon said levers are secured, mechanism for operating said cut-offs, scale hoppers having pivoted bottom plates provided beneath said measuring devices, a packing auger, a movable sack platform, and mechanism actuated by the movement of said platform for operating said shafts and levers to release said cut-offs, substantially as described.

In witness whereof, I have hereunto set my hand this 14th day of June, 1904.

EDWIN GUSTAVE STAUDE.

In presence of—
RICHARD PAUL,
M. HAGERTY.